(12) United States Patent
Maraz

(10) Patent No.: US 8,239,269 B2
(45) Date of Patent: Aug. 7, 2012

(54) SYSTEM AND/OR METHOD FOR HANDLING RETURNS INVOLVING PRODUCTS TIED TO POST-PAID SUBSCRIPTIONS/SERVICES

(75) Inventor: Maridee Joy Maraz, Sammamish, WA (US)

(73) Assignee: Nintendo of America Inc., Redmond, WA (US)

( * ) Notice: Subject to any disclaimer, the term of this patent is extended or adjusted under 35 U.S.C. 154(b) by 70 days.

(21) Appl. No.: 12/585,310

(22) Filed: Sep. 11, 2009

(65) Prior Publication Data

US 2011/0066514 A1    Mar. 17, 2011

(51) Int. Cl.
G06Q 50/00    (2012.01)
G06Q 20/00    (2012.01)
G06Q 30/00    (2012.01)
G07G 1/12    (2006.01)

(52) U.S. Cl. ............... 705/17; 705/340; 705/24; 705/22
(58) Field of Classification Search .................. None
See application file for complete search history.

(56) References Cited

U.S. PATENT DOCUMENTS

| 789,106 | A | 5/1905 | Seymour |
| 1,330,368 | A | 2/1920 | Boos |
| 1,393,489 | A | 10/1921 | Boos |
| 1,476,819 | A | 12/1923 | Hope |
| 4,312,037 | A | 1/1982 | Yamakita |
| 4,414,467 | A | 11/1983 | Gould et al. |
| 4,458,802 | A | 7/1984 | Maciver et al. |
| 4,563,739 | A | 1/1986 | Gerpheide et al. |
| 4,598,810 | A | 7/1986 | Shore et al. |
| 4,668,150 | A | 5/1987 | Blumberg |
| 4,734,005 | A | 3/1988 | Blumberg |
| 4,750,119 | A | 6/1988 | Cohen et al. |
| 4,789,054 | A | 12/1988 | Shore et al. |
| 4,792,018 | A | 12/1988 | Humble et al. |
| 4,803,348 | A | 2/1989 | Lohrey et al. |
| 4,812,629 | A | 3/1989 | O'Neil et al. |

(Continued)

FOREIGN PATENT DOCUMENTS

BR    PI 9813567-8    10/2000

(Continued)

OTHER PUBLICATIONS

Hughes Network Systems, LLC., "HughesNet Terms & Conditions", http://www.nationwidesatellite.com/HughesNet/service/HughesNet_terms.asp, available online Sep. 2, 2008.*

(Continued)

*Primary Examiner* — M. Thein
*Assistant Examiner* — Ariel Yu
(74) *Attorney, Agent, or Firm* — Nixon & Vanderhye PC

(57) ABSTRACT

The exemplary embodiments described herein relate to the field of electronic registration (ER) of purchased products and, more particularly, to an improved electronic registration system that enables unique item-level tracking from an initial point-of-sale (POS) transaction involving a post-paid service/subscription and related device or product, to any cancellations in service and returns to the store or service provider. Certain exemplary embodiments thus advantageously "close the gap" between retailers and service providers, e.g., in connection with subscriptions/post-paid service agreements and related devices or products. In certain exemplary embodiments, an "interest" may be taken and charged in the event that the customer does not return the device when or after an associated service has been cancelled.

19 Claims, 6 Drawing Sheets

U.S. PATENT DOCUMENTS

| | | |
|---|---|---|
| 4,814,592 A | 3/1989 | Bradt et al. |
| 4,839,505 A | 6/1989 | Bradt et al. |
| 4,858,743 A | 8/1989 | Paraskevakos et al. |
| 4,866,661 A | 9/1989 | De Prins |
| 4,871,054 A | 10/1989 | Murray |
| 4,884,212 A | 11/1989 | Stutsman |
| 4,893,705 A | 1/1990 | Brown |
| 4,896,024 A | 1/1990 | Morello et al. |
| 4,903,815 A | 2/1990 | Hirschfeld et al. |
| 4,967,906 A | 11/1990 | Morello et al. |
| 4,984,155 A | 1/1991 | Geier et al. |
| 4,997,076 A | 3/1991 | Hirschfeld et al. |
| 5,007,518 A | 4/1991 | Crooks et al. |
| 5,020,958 A | 6/1991 | Tuttobene |
| 5,028,766 A | 7/1991 | Shah |
| 5,042,686 A | 8/1991 | Stucki |
| 5,128,520 A | 7/1992 | Rando et al. |
| 5,128,527 A | 7/1992 | Kawai et al. |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,216,612 A | 6/1993 | Cornett et al. |
| 5,231,569 A | 7/1993 | Myatt et al. |
| 5,256,863 A | 10/1993 | Ferguson et al. |
| 5,257,741 A | 11/1993 | Rode et al. |
| 5,273,183 A | 12/1993 | Tuttobene |
| 5,311,424 A | 5/1994 | Mukherjee et al. |
| 5,367,148 A | 11/1994 | Storch et al. |
| 5,372,386 A | 12/1994 | Mills |
| 5,375,240 A | 12/1994 | Grundy |
| 5,414,252 A | 5/1995 | Shinoda et al. |
| 5,416,306 A | 5/1995 | Imahata |
| 5,478,990 A | 12/1995 | Montanari et al. |
| 5,520,990 A | 5/1996 | Rotermund |
| 5,521,815 A | 5/1996 | Rose, Jr. |
| 5,537,314 A | 7/1996 | Kanter |
| 5,541,394 A | 7/1996 | Kouchi et al. |
| 5,581,064 A | 12/1996 | Riley et al. |
| 5,602,377 A | 2/1997 | Beller et al. |
| 5,671,279 A | 9/1997 | Elgamal |
| 5,712,989 A | 1/1998 | Johnson et al. |
| 5,721,832 A | 2/1998 | Westrope et al. |
| 5,737,726 A | 4/1998 | Cameron et al. |
| 5,745,036 A | 4/1998 | Clare |
| 5,799,285 A | 8/1998 | Klingman |
| 5,804,803 A | 9/1998 | Cragun et al. |
| 5,857,175 A | 1/1999 | Day et al. |
| 5,889,270 A | 3/1999 | Van Haagen et al. |
| 5,890,138 A | 3/1999 | Goidin |
| 5,895,453 A | 4/1999 | Cook |
| 5,913,210 A | 6/1999 | Call |
| 5,918,213 A | 6/1999 | Bernard et al. |
| 5,918,214 A | 6/1999 | Perkowski |
| 5,949,335 A | 9/1999 | Maynard |
| 5,950,173 A | 9/1999 | Perkowski |
| 5,966,450 A | 10/1999 | Hosford et al. |
| 5,968,110 A | 10/1999 | Westrope et al. |
| 5,978,774 A * | 11/1999 | Rogers et al. ................ 705/24 |
| 5,984,508 A | 11/1999 | Hurley |
| 6,014,635 A | 1/2000 | Harris et al. |
| 6,016,480 A | 1/2000 | Houvener et al. |
| 6,018,719 A | 1/2000 | Rogers et al. |
| 6,025,780 A | 2/2000 | Bowers et al. |
| 6,029,139 A | 2/2000 | Cunningham et al. |
| 6,029,141 A | 2/2000 | Bezos et al. |
| 6,039,244 A | 3/2000 | Finstrewald |
| 6,049,778 A | 4/2000 | Walker et al. |
| 6,055,511 A | 4/2000 | Luebbering et al. |
| 6,064,979 A | 5/2000 | Perkowski |
| 6,085,167 A | 7/2000 | Iguchi |
| 6,085,172 A | 7/2000 | Junger |
| 6,105,001 A | 8/2000 | Masi et al. |
| 6,115,690 A | 9/2000 | Wong |
| 6,119,099 A | 9/2000 | Walker et al. |
| 6,119,164 A | 9/2000 | Basche |
| 6,125,352 A | 9/2000 | Franklin et al. |
| 6,131,088 A | 10/2000 | Hill |
| 6,134,533 A | 10/2000 | Shell |
| 6,148,249 A | 11/2000 | Newman |
| 6,154,738 A | 11/2000 | Call |
| 6,219,652 B1 | 4/2001 | Carter et al. |
| 6,222,914 B1 | 4/2001 | McMullin |
| 6,269,344 B1 | 7/2001 | Junger |
| 6,317,028 B1 | 11/2001 | Valiulis |
| 6,463,421 B2 | 10/2002 | Junger |
| 6,536,659 B1 | 3/2003 | Hauser |
| 6,542,933 B1 | 4/2003 | Durst et al. |
| 6,550,685 B1 | 4/2003 | Kindberg |
| 6,554,187 B2 | 4/2003 | Otto |
| 6,606,608 B1 | 8/2003 | Bezos |
| 6,618,706 B1 * | 9/2003 | Rive et al. ........................ 705/30 |
| 6,697,812 B1 | 2/2004 | Martin |
| 6,746,053 B1 | 6/2004 | Afzali-Ardakani et al. |
| 6,757,663 B1 | 6/2004 | Rogers et al. |
| 6,834,268 B2 | 12/2004 | Junger |
| 6,933,848 B1 | 8/2005 | Stewart et al. |
| 6,947,941 B1 | 9/2005 | Koon |
| 6,965,866 B2 | 11/2005 | Klein |
| 7,000,834 B2 | 2/2006 | Hind et al. |
| 7,013,288 B1 * | 3/2006 | Reifel et al. ................. 705/14.1 |
| 7,117,227 B2 | 10/2006 | Call |
| 7,118,478 B2 | 10/2006 | Fayter et al. |
| 7,143,055 B1 | 11/2006 | Perkowski |
| 7,162,440 B2 | 1/2007 | Koons |
| 7,363,248 B2 * | 4/2008 | Rollins et al. ................ 705/26.8 |
| 7,376,572 B2 | 5/2008 | Siegel |
| 7,379,899 B1 | 5/2008 | Junger |
| 7,415,429 B2 * | 8/2008 | Rollins et al. ................ 705/27.1 |
| 7,415,617 B2 | 8/2008 | Ginter et al. |
| 7,455,230 B2 | 11/2008 | Junger et al. |
| 7,475,028 B2 * | 1/2009 | Loeb et al. ................. 705/26.81 |
| 7,580,860 B2 | 8/2009 | Junger |
| 7,693,731 B1 | 4/2010 | Weber et al. |
| 7,729,923 B2 | 6/2010 | O'Connor |
| 7,769,695 B2 * | 8/2010 | Robinson et al. ................ 705/64 |
| 7,797,164 B2 | 9/2010 | Junger et al. |
| 7,840,439 B2 | 11/2010 | Junger |
| 7,850,081 B2 | 12/2010 | Swan et al. |
| 7,873,985 B2 * | 1/2011 | Baum ................................ 726/2 |
| 7,890,373 B2 | 2/2011 | Junger |
| 2002/0010627 A1 | 1/2002 | Lerat |
| 2002/0032612 A1 | 3/2002 | Williams et al. |
| 2002/0116274 A1 | 8/2002 | Hind et al. |
| 2002/0133425 A1 | 9/2002 | Pederson et al. |
| 2002/0143671 A1 | 10/2002 | Afzali-Ardakani et al. |
| 2002/0169671 A1 * | 11/2002 | Junger ........................... 705/14 |
| 2003/0050891 A1 | 3/2003 | Cohen |
| 2003/0094494 A1 | 5/2003 | Blanford et al. |
| 2003/0126034 A1 | 7/2003 | Cheney et al. |
| 2003/0141358 A1 | 7/2003 | Hudson et al. |
| 2004/0006514 A1 | 1/2004 | Rogers |
| 2004/0029565 A1 * | 2/2004 | Shibata et al. ................. 455/411 |
| 2004/0054900 A1 | 3/2004 | He |
| 2004/0153344 A1 | 8/2004 | Bui et al. |
| 2004/0172260 A1 | 9/2004 | Junger et al. |
| 2004/0195341 A1 | 10/2004 | Lapstun et al. |
| 2005/0049927 A1 * | 3/2005 | Zelanis et al. ................... 705/26 |
| 2005/0097054 A1 | 5/2005 | Dillon |
| 2005/0100144 A1 | 5/2005 | O'Connor |
| 2005/0137882 A1 | 6/2005 | Cameron et al. |
| 2006/0175401 A1 | 8/2006 | Roberts |
| 2007/0100761 A1 | 5/2007 | Dillon |
| 2007/0162343 A1 * | 7/2007 | Landesmann ................... 705/14 |
| 2007/0185788 A1 | 8/2007 | Dillon |
| 2008/0008348 A1 | 1/2008 | Metois |
| 2008/0052184 A1 | 2/2008 | Junger et al. |
| 2008/0059226 A1 | 3/2008 | Melker |
| 2008/0262948 A1 * | 10/2008 | Grady et al. ..................... 705/28 |
| 2009/0150170 A1 | 6/2009 | Junger et al. |
| 2009/0281935 A1 | 11/2009 | Junger |
| 2010/0185533 A1 | 7/2010 | O'Connor |
| 2010/0235290 A1 | 9/2010 | Junger et al. |
| 2010/0257486 A1 | 10/2010 | Smith |
| 2010/0325020 A1 | 12/2010 | Junger et al. |

| | | | | | |
|---|---|---|---|---|---|
| 2011/0016008 | A1 | 1/2011 | Maraz et al. | | |
| 2011/0029397 | A1 | 2/2011 | Junger | | |
| 2011/0066514 | A1 | 3/2011 | Maraz | | |

| | | |
|---|---|---|
| WO | 89/09460 | 10/1989 |
| WO | 92/01273 | 1/1992 |
| WO | 99/33016 | 7/1999 |

FOREIGN PATENT DOCUMENTS

| | | |
|---|---|---|
| BR | 0101819-1 | 2/2003 |
| BR | PI 0503016-1 | 10/2005 |
| BR | PI 0505846-5 | 9/2007 |
| CA | 2404814 | 9/2002 |
| CN | 1177408 | 3/1998 |
| CN | 1289972 | 4/2001 |
| CN | 101068731 | 11/2007 |
| CN | 101089871 | 12/2007 |
| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| EP | 1028386 | 8/2000 |
| EP | 1841195 | 11/2000 |
| EP | 1195704 | 4/2002 |
| EP | 1246109 | 10/2002 |
| EP | 1571541 | 3/2005 |
| EP | 1667018 | 10/2005 |
| EP | 2036015 | 12/2007 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| GT | 200000127 | 10/2000 |
| GT | 200000061 | 11/2000 |
| GT | 200300100 | 3/2006 |
| GT | 200200141 | 7/2007 |
| IN | 1072/CHENP/2003 | 7/2005 |
| IN | 1763/CHENP/2003 | 3/2007 |
| IN | 2137/CHENP/2005 | 7/2007 |
| IN | 538/MUM/2008 | 4/2008 |
| IN | 8258/DELNP/2007 | 4/2008 |
| IN | 8266/DELNP/2007 | 7/2008 |
| IN | 303/KOLNP/2008 | 12/2008 |
| IN | 53/KOL/2008 | 4/2009 |
| IN | 1421/KOLNP/2009 | 6/2009 |
| JP | 02-139698 | 5/1990 |
| JP | 04-347793 | 12/1992 |
| JP | 05-178422 | 7/1993 |
| JP | 05-342482 | 12/1993 |
| JP | 08-124033 | 5/1996 |
| JP | 10-188141 | 7/1998 |
| JP | 10-340301 | 12/1998 |
| JP | 11-066176 | 3/1999 |
| JP | 11-143954 | 5/1999 |
| JP | 2000-123078 | 4/2000 |
| JP | 2002-279090 | 9/2002 |
| JP | 2002-133080 | 10/2002 |
| JP | 2003-316871 | 11/2003 |
| JP | 2005-141374 | 6/2005 |
| JP | 2005-234981 | 9/2005 |
| JP | 2007-226516 | 9/2007 |
| JP | 2007-257561 | 10/2007 |
| JP | 2008-197768 | 8/2008 |
| JP | 2009-032171 | 2/2009 |
| MX | 218248 | 3/1998 |
| MX | PA/a/2000/002497 | 3/1999 |
| MX | 221246 | 7/1999 |
| MX | PA/a/2002/000636 | 11/2001 |
| MX | MX/a/2007/014520 | 11/2006 |
| SV | 1991000023 | 1/1991 |
| SV | 1996000019 | 1/1996 |
| SV | 1998000129 | 1/1998 |
| SV | 2000000045 | 1/2000 |
| SV | 2000000145 | 1/2000 |
| SV | 2003001513 | 1/2003 |
| SV | 2003001514 | 1/2003 |
| WO | 87/00948 | 2/1987 |
| WO | 88/02524 | 4/1988 |
| WO | 88/06771 | 9/1988 |

OTHER PUBLICATIONS

"Man accused in Lego selling scam", http://www.kptv.com/Global/story.asp?S=4137050&nav=muni156_2, Nov. 18, 2005, 1 page.

"No more scamming Super Mario," Automatic I.D. News, vol. 12, p. 15, Sep. 1996, 3 pages.

"Software Maker Promises Many Happy Returns", Drug Topics, vol. 140, No. 5, pp. 124-128 (Mar. 4, 1996).

Jan. 6, 2005 Blog (Message 4 of 17) about Schuman article"Bar-Code Scam at Wal-Mart: A Matter of Priorities".

Jan. 13, 2005 Blog (Message 14 of 17) about Schuman article"Bar-Code Scam at Wal-Mart: A Matter of Priorities".

1992 Nintendo Product Returns Policy.

1994 Nintendo Product Returns Policies and Procedures.

1995 Nintendo Product Returns Policies and Procedures.

1996 Nintendo Product Returns Policies and Procedures, 4 pages.

Amazon.com Returns Policy, Our Return Policy is Simple, Jun. 20, 2000, Amazon.com, www.amazon.com/exec/obidos/subst/help/returns-policy.html, pp. 1-2.

Automotive News, "Reynolds, ADP differ on superhighway progress", Crain Communications, Inc., Apr. 11, 1994, 3 pages.

Birnbaum, Henry, General Information Manual: IBM Circulation Control at Brooklyn College Library, 29pp. (ON 001822-ON 001850.

Brewin et al., "Follow That Package!", Computer World, vol. 35, No. 12, Mar. 19, 2001, 4 pages.

Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.

Business Wire, "DataTrend receives award from AT&T Global Information Solutions", Business Wire, Inc., Nov. 7, 1995, 2 pages.

Business Wire, "Multimillion-dollar Health-care Products", Business Wire, Inc., Dec. 15, 1993, 2 pages.

CollegeTermPapers web page printout, "History of Fed Ex", www.collegetermpaper...rmPapers/Aviation/history_of_fed_ex.html (Aug. 24, 2001), 7 pages.

Collins, David Jarrett and Nancy Nasuti Whipple, Using Bar Code: Why It's Taking Over, Second Edition (ON 003696-ON 004031).

Computer Reseller News, "Case Study; Tapping the Channel's 'Best in Class' ", CMP Publications, Inc., Jan. 30, 1995, 2 pages.

Consumer Electronics, Warren Publishing, Inc., Consumer Electronics Personals, vol. 35, No. 6, p. 18.

Cooper, Michael D., Design of Library Automation Systems, pp. 83-109 (ON 1859-ON 001873).

Corbin, John, Developing Computer-Based Library Systems, pp. 144-149 (ON 001874-ON 001877).

DataPhase, Inc. Automated Circulation System, 43 pp. (ON 001878-ON 001904).

Deposition of Peter J. Junger, vol. 1 & 2 (Nov. 8-9, 2001) and Exhibits 1-4 & 8-19.

Deposition of Philip M. Rogers (Nov. 7, 2001) and Exhibits 1-19.

Dilger, "The other direction," Manufacturing Systems, v. 15, n. 10, pp. 12-13, Oct. 1997, 2 pages.

Direct Return 2000, Software Overview, http://www.directreturn.com/software_overview.htm, Copyright © 2000 Pharmacy Software Solutions, Inc.

Discount Store News, "New Policy System can Pare Suspect Returns, Cut Losses", Discount Store News, Lebhar-Friedman Inc., Jan. 1, 1996, 2 pages.

Dowlin, Kenneth E., "MAGGIE III: The Prototypical Library System", Library Hi Tech, Issue 16, vol. 4, No. 4, Winter 1986, pp. 7-15 (ON 001960-ON 001970).

Dranov, Paula, Automated Library Circulation Systems, 1977-78, pp. 24-47 (ON 001905-ON 001929).

Dreamcom web page printout, www.dreamcomdirect.com/RMA.htm (May 25, 1997).

Emigh, Jacqueline, "Item-Level RFID is Years Away for Retailers", eWeek, Jan. 5, 2005.

Federal Express Information Packet, 56 pages (incl. cover and table of contents).
Fox Appliance Return Parts Policy, Aug. 5, 2003, www.foxmacon.com, online, pp. 1-3.
Georgianis, Maria, "Computer City Moves to Consolidate Returns", Computer Retail Systems, vol. 6, No. 125, Jan. 22, 1998, 2 pages.
Grace, "ABCD Looks to Adopt EDI Transaction Sets", Computer Reseller News, CMP Publications, Inc., Jun. 28, 1993, 2 pages.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.
Grosch, Audrey N., Distributed Computing and the Electronic Library: Micros to Superminis, pp. 78-79 (ON 002144-ON 002146).
Grotta, "Return to vendor: the right way to make mail-order returns", PC Sources, Information Access Company, a Thomson Corporation Company, ASAP Coastal Associates Publishing L.P., Feb. 1992, 10 pages.
Heller, "High cost of returns prompts industry cooperation," Discount Store News, Oct. 1998, 3 pages.
Hoadley, Irene Braden and A. Robert Thorson, An Automated On-Line Circulation System: Evaluation, Development, Use, 1973, 19 pp. (ON 001930-ON 001948).
Hughes Network Systems, LLC, "HughesNet Terms & Conditions", http://www.nationwidesatellite.com/HughesNet/service/HughesNet_terms.asp, available online Sep. 2, 2008.
IBM Systems Journal, vol. 14, No. 1, 1975, pp. 1-101.
Information Disclosure Statement filed in U.S. Appl. No. 08/725,259 on Oct. 5, 1998.
Information Disclosure Statement filed in U.S. Appl. No. 09/065,552 on Jul. 19, 1999.
Information Disclosure Statement filed in U.S. Appl. No. 09/362,187 on Oct. 26, 2001.
Information Disclosure Statement filed in U.S. Appl. No. 09/494,540 on Jan. 31, 2000.
Information Disclosure Statement filed in U.S. Appl. No. 09/509,021 on Oct. 26, 2001.
Information Disclosure Statement filed in U.S. Appl. No. 09/809,072 on Oct. 26, 2001.
Jiji Press Ticker Service, "JCCI Issues Booklet to Explain Distribution", JiJi Press Ltd., Jul. 20, 1989, 1 page.
Jiji Press Ticker Service, "Miti Working Out Business Practice Guidelines", JiJi Press Ltd., Apr. 20, 1990, 1 page.
Joachim, "FedEx Delivers on CEO's IT Vision", InternetWeek, Oct. 25, 1999, 4 pages.
LaPlante, "Rugby Darby; From proprietary host to a distributed LAN-based architecture in 2 years", InfoWorld, InfoWorld Media Group, Nov. 15, 1993, 4 pages.
Leyden, "Burgled mum finds stolen iPod on eBay," The Register, May 17, 2005, 1 page.
Longwell, "Robec Links Its 18 Sales Facilities Via Newly Adopted NetWare System", Computer Reseller News, Sep. 6, 1993.
Longwell, "Western Digital Wins—Price/performance gives driver maker victory margin", Computer Reseller News, CMP Publications, Inc., Jun. 28, 1993, 3 pages.
Margulis, "Reclaim: an efficient way to handle damaged products", U.S. Distribution Journal, BMT Publications Inc., Mar. 15, 1992, 7 pages.
Matthews, Joseph R., "Graphical User Interfaces GUI in Library Products", Library Technology Reports, vol. 32, No. 1, Jan. 1996, p. 53 (ON 001972-ON 001976).

Meyer, James, "NOTIS: The System and Its Features", Library Hi Tech, Issue 10, vol. 3, No. 2, 1985, pp. 81-89 (ON 001949-ON 001959).
Narda News, "Retailing in Cyberspace", Apr. 1995, pp. 21-22.
Nintendo Gameboy Point of Purchase Mail-In Card.
PR Newswire, "CompuServe Introduces Electronic Product Registration Software", PR Newswire Association, Inc., Mar. 10, 1994, 2 pages.
PR Newswire, "Escada Offers a Garden Variety for Spring", PR Newswire Association, Inc., Mar. 10, 1994, 2 pages.
Quinn, "Why Wang took the third-party route", Information Access Company, a Thomson Corporation Company, ASAP Reed Publishing USA, vol. 30, No. 2, p. 30, Feb. 1991.
Reynolds, Dennis, Library Automation: Issues and Applications, pp. 42-49 and pp. 146-149 (ON 002147-ON 002153).
Rigney, "User Migrates to Windows NT", InternetWeek, CMP Publications, Inc., Jan. 10, 1994, 2 pages.
Rogers et al., "Going Backwards: Reverse Logistics Trends and Practices", Reverse Logistics Executive Council, 1998 (entire book).
Rosenbloom, "Midnight Express", Inc., Jul. 2001, 4 pages.
Saffady, William, "Integrated Library Systems for Microcomputers and Mainframes: A Vendor Study", Library Technology Reports, vol. 30, No. 1, Jan. 1994, p. 5 (ON 001977-ON 002087).
Saffady, William, "Vendors of Integrated Library Systems for Microcomputers and Mainframes: An Industry Report, part 1", Library Techology Reports, vol. 33, No. 3, May 1997, p. 277 (ON 002088-ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Salmon, Stephen R., Library Automation Systems, p. 239 (ON 002154-ON 002155).
Salton, Gerard, Dynamic Information and Library Processing, pp. 62-69 (ON 002139-ON 002143).
Scala, Betsy Video Business, "Distributors seek 30-day returns", v 13, n 3, p. I + Jan. 22, 1993.
Scala, Betsy Video Business, "Distributors seek 30-day returns", v 15, n 39, p. I + Oct. 6, 1995.
Schuman, Evan,"Bar-Code Scam at Wal-Mart: A Matter of Priorities", eWeek, Jan. 5, 2005.
Schuman, Evan,"Wal-Mart Stung in $1.5 Million Bar-Code Scam", eWeek, Jan. 5, 2005.
Sigafoos et al., "Absolutely Positively Overnight!: The Unofficial Corporate History of Federal Express", St. Luke Press, 1988, pp. 1-22.
Sleeper, "FedEx Pushes the Right Buttons to Remain No. 1 in Fast Shipping", Investors Business Daily, May 25, 2001, 2 pages.
Synchronics Software Product Information guide, 95 pages.
Synchronics® User Manual: Inventory Plus, Version 6.5, Apr. 1993 (ON 004464-ON 005116).
Synchronics® User Manual: Point of Sale, Version 6.5, Apr. 1993 (ON 005117-ON 005892).
White, Howard S., Library Technology Reports, Mar.-Apr. 1982, vol. 18, No. 2, pp. 178-184 (ON 001851-ON 001858).
Witt, "How to Master the Art of Returns: Automation is the Key", Material Handling Engineering, Jun. 1994, pp. 58-60.
Witt et al., "Distribution: a differentiator in 2000", Material Handling Engineering, Penton Publishing Inc., Oct. 1995, 15 pages.

* cited by examiner

SYSTEM AND/OR METHOD FOR HANDLING RETURNS INVOLVING PRODUCTS TIED TO POST-PAID SUBSCRIPTIONS/SERVICES

TECHNICAL FIELD

The exemplary embodiments described herein relate to the field of electronic registration (ER) of purchased products and, more particularly, to an improved electronic registration system that enables unique item-level tracking from an initial point-of-sale (POS) transaction involving a post-paid service/subscription and related device or product, to any cancellations in service and returns to the store or service provider. Certain exemplary embodiments thus "close the gap" between retailers and service providers, e.g., in connection with subscriptions/post-paid service agreements and related devices or products.

BACKGROUND AND SUMMARY

Electronic registration (ER) of product transactions recently has become available for the purpose of reducing unauthorized returns of purchased products and/or unauthorized warranty repair on purchased products. Electronic product registrations systems provided for this purpose are disclosed in, for example, U.S. Pat. Nos. 5,978,774; 6,018,719; and 6,085,172, the disclosures of which are all incorporated by reference herein in their entirety. The electronic registration system relies on the use of a unique identifier, such as a serial number linked to a UPC (and/or RFID) or its equivalent, for each product that is purchased. The serial number is obtained at the point of sale for inclusion in a registration database, together with other information, such as a date of transaction. This database can then be accessed in connection with an attempted product return/warranty transaction for the purpose of determining if the product qualifies for return/warranty under applicable return/warranty criteria under which the product was originally sold. Such electronic systems may also be used in connection with repair and/or exchange transactions, in addition to returns, by enabling an accurate determination as to whether the product qualifies for any of these actions under the appropriate policies and criteria under which the product was originally sold.

The ER system uses pre-established return/repair policies and procedures that are programmed into the ER system so that the system can perform a check when a product is presented for return to determine if the product qualifies for return, replacement and/or warranty repair based on sales transaction information available in the ER system for the particular product at issue. Thus, known ER systems include a database of return qualification information (or warranty/replacement criteria) for various manufacturers and/or retailers which enables the system to make an accurate determination with respect to whether or not a product actually qualifies for return (or warranty/replacement) based on the appropriate criteria and at the time the product is actually presented for return. Such ER systems have greatly reduced improper and fraudulent returns and warranty claims.

While such ER systems have proven to be very useful in their current forms, additional improvements in the system are still desired to make such ER systems more flexible in operation in order to benefit customers, retailers, and manufacturers. For example, problems may arise in situations where retailers expect to receive commissions from service provides for the sale of hardware devices that accompany subscription/post-paid service agreements. Currently, retailers deeply discount their wireless hardware devices, for instance, for promotions designed to entice consumers to sign up for subscription/post-paid service agreements. Wireless service providers then pay commissions to retailers, after a predetermined period of time with the service, for each new customer acquired. This commission is intended to make up for the loss on (or reduced margin for) the hardware cost at the point-of-sale (POS). For example, a retailer may sell a "voice plan" for a mobile phone on behalf of a service provider (e.g., AT&T, Verizon, etc.) to a consumer and offer a mobile phone to the consumer at a reduced or zero cost. After a predetermined amount of time (such as, for example, 30 days), the service provider may provide a commission to the retailer, thus offsetting some or all of the loss incurred by the retailer.

A challenge facing the industry involves customers cancelling their services directly with the wireless service providers during a time window before which the retailer is eligible for the activation commission. Upon cancellation, the consumer typically is advised to return the hardware. Unfortunately, such returns are not consistently completed or tracked at the unique item level. A retailer thus may lose both a commission and the device. Because the customer typically signs a contract or agreement with the service provider as opposed to the retailer, the retailer is left with little recourse when attempting to reclaim the product and/or avoid having to forego the commission.

Consumer fraud is another challenge facing the industry. In an unfortunately not-uncommon scheme, devices are purchased from retail locations for free or reduced prices and the corresponding contracts are cancelled. Rather than returning the devices, however, they are shipped overseas, sold on Internet auction sites, pawned, etc. Any residual value thus benefits the scammer, while the retailer is left with the loss on the hardware cost.

These problems are related, in part, to the fact that retailers and wireless service providers do not have a systematized tracking system supporting the return of wireless devices.

Thus, it will be appreciated that there is a need in the art for improved ER techniques that close the gap between retailers and service providers, e.g., in connection with subscriptions/post-paid service agreements and related hardware and/or other devices or products.

One aspect of certain exemplary embodiments of this invention relates to closing the gap between retailers and service providers, e.g., in connection with subscriptions/post-paid service agreements and related hardware and/or other devices or products.

Another aspect of certain exemplary embodiments relates to providing unique item-level tracking from the POS transaction through to any cancellations in service and returns to the store or service provider.

Another aspect of certain exemplary embodiments relates to the ability to provide an override a return decline, on a serial number level (e.g., via the ER system and its associated return validation program), to authorize returns outside of the retailer return policy, when such returns are "expected" via a cancellation update registration from a wireless service provider.

According to certain exemplary embodiments, a method of facilitating return of products sold in connection with services at point-of-sale (POS) locations is provided. A sale of a service and a product associated with the service to a customer are registered with an electronic registration (ER) system, with the registering including storing an original sale date and an identifier associated with the product in an ER database of the ER system. When the service is cancelled by the customer at the POS location: (1) a return transaction is processed in accordance with a return policy of the POS location and/or the service provider, and the ER database is updated to reflect the return of the product and the cancellation of the service. When the service is cancelled by the customer through the service provider: (1) a monetary interest is taken from the user in the event that the customer does not subsequently return the product to the POS location, and (2) the ER database is updated to reflect the cancellation of the service and the taking of the interest.

According to certain exemplary embodiments, an electronic registration (ER) system is provided. An ER database is configured to store information pertaining to sales of services and products associated with the services, with the information including original sale dates and identifiers associated with the products, and with the sales having taken place at point-of-sale (POS) locations. A computer is configured to execute instructions tangibly stored on a computer-readable storage medium, with the instructions causing the computer to perform a method comprising: processing a return transaction in accordance with a return policy of the POS location and/or the service provider and updating the ER database to reflect the return of the product and the cancellation of the service when a service is cancelled by a customer at a POS location; and taking a monetary interest from the user in the event that the customer does not subsequently return the product to the POS location and updating the ER database to reflect the cancellation of the service and the taking of the interest when the service is cancelled by the customer through the service provider.

It will be appreciated that these aspects and embodiments may be combined in various combinations and sub-combinations to achieve yet further exemplary embodiments. Also, it will be appreciated that the exemplary embodiments herein may be implemented as any suitable combination of programmed logic circuitry including, for example, hardware, software, firmware, etc.

BRIEF DESCRIPTION OF THE DRAWINGS

These and other features and advantages will be better and more completely understood by referring to the following detailed of exemplary illustrative non-limiting implementations in conjunction with the drawings, of which.

DETAILED DESCRIPTION

Figure 1:
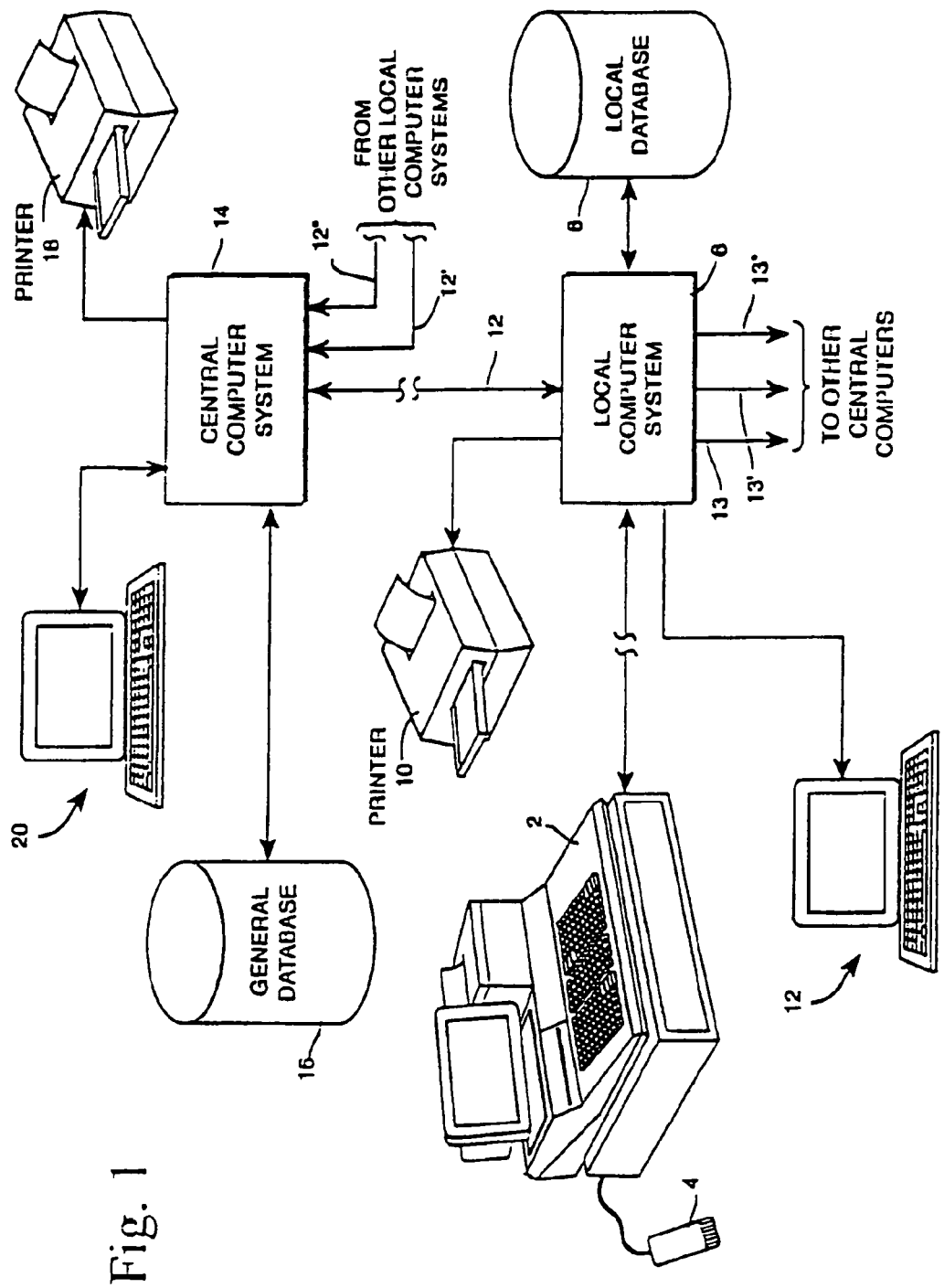
FIG. 1 is a schematic block diagram illustrating an example of an overall electronic product registration (ER) system that may be used in accordance with an exemplary embodiment.

An example of one type of electronic product registration (ER) system that is preferably used in connection with the instant invention is illustrated in FIG. 1. Briefly, this example system includes a point of sale register 2 and an associated bar code scanner 4. The register 2 is preferably connected with a local computer system 6 in any suitable manner. In certain situations (e.g., single store retailers), it may be advantageous to have the local computer system 6 located in proximity to the register 2. For large chain stores, however, it may be advantageous to situate the local retailer computer 6 at a central location with links to the registers 2 at individual stores. The particular arrangement will depend on the preferences and circumstances of the specific retailer and may vary in accordance therewith.

The local retailer computer system includes an associated local database 8 for storing registration information. Additionally, a local printer 10 and an operator terminal 12 may be provided. The operator terminal may be used, for example, by a store clerk upon return of merchandise to locate pertinent sales information in the local database 8. The printer 10 may be used to produce hard copies of, for example, end-of-day sales reports and/or the like.

In the exemplary embodiment, a communication channel 12 is provided between the retailer computer system 6 and a central computer system 14. The central registration computer system may, for example, be an independent registration center computer system which electronically registers product transactions for a number of different retailers. In other words, the central computer system may be operated by a third-party service provider.

A general registration database 16 is associated with the central registration computer system 14 for storing transaction information from a plurality of retailer computer systems 6. Additionally, a printer 18 and an operator terminal 20 may be included with the central registration computer system 14. As discussed below in greater detail, the central registration computer system may maintain a number of data files pertaining to individual retailers, manufactures and the like. These data files include information applicable to the particular individual retailer, distributor, manufacturer or the like and are preferably maintained by that particular individual or entity. For example, a data file may contain specific return/warranty policy information applicable to that particular individual or entity.

It should be appreciated that the central computer system 14 is preferably intended to handle product registrations for a number of different manufacturers and/or other vendors. Accordingly, the general registration database may employ a structure wherein the product registrations for each participating vendor are maintained in separate areas. Alternatively, separate databases may be employed for each participating vendor. Of course, other data structures may be employed so long as the registration center is able to properly keep track of the product transaction information and particular return and/or warranty policies associated with each transaction.

As illustrated in FIG. 1, the central registration computer system 14 may have a number of additional communications links 12', 12", etc. for receiving information from other local computer systems. Thus, for example, a registration center may receive information from a number of different retailers. Additionally, the local computer system 6 may include a number of additional communication channels 13, 13', 13", etc. for connecting with other central computer systems. Accordingly, an individual retailer can electronically register products with a number of different registration databases, if desired. Furthermore, a number of communication channels can be provided for communications between the central registration computer system 14 and individual manufacturer computer systems and computer systems of third party service providers, law enforcement agencies and/or the like. Of course, a general access channel such as an Internet connection may also be made available for authorized access to the central computer system 14.

The electronic registration process begins when a customer brings merchandise to the register 2 for check-out. The sales clerk enters the SKU number which identifies the type of product involved in the transaction (e.g., Super Nintendo Entertainment System, Nintendo Game Boy, Nintendo N64, etc.) by, for example, scanning a UPC product code included on the product packaging. Of course, key entry or another technique for entering the SKU number may be used. Electronic registration might not be necessary for a substantial number of small commodity products (e.g., batteries, candy, diapers, etc.) that are commonly sold by retailers. Accordingly, a check may be made, based on the type of product as identified by the UPC code, to determine whether this is a product for which electronic registration is desired. If so, the store associate is prompted to enter the serial number of the individual item.

The serial number may be entered, for example, by scanning a serial number printed on the packaging. Alternatively, the serial number as it appears on the product may be scanned through a window in the packaging. This alternative ensures that the individual product is identified even if it is mispackaged. Also, repackaging of returned merchandise would be simplified. Other techniques, such as key entry, may also be used. Because the serial number is unique to each individual product, it acts as individual production identification information.

Once the serial number is entered; a check may be made to ensure that the serial number is valid. If not, the store associate is again prompted to enter the serial number. This is repeated until a valid serial number is obtained. Once the serial number is verified, a local database may be updated with the serial number information and any other necessary or desired information. At minimum, however, the local database should include an indication of the date on which the transaction took place. Other information might include the price paid, the store associate responsible for the sale, and the like.

The serial number of the individual product is preferable printed as part of a written customer transaction receipt. The serial number may be printed adjacent the description and SKU number of the registered product. Thus, it will be a simple matter to correlate serial numbers with associated products, particularly when several registered products appear on a single customer sales receipt. Of course, additional information may be printed as well.

The date of the transaction will typically be printed at either the beginning or the end of the sales receipt, but may appear anywhere on the receipt. After the serial number is printed, a check is made to determine whether sales are complete. Ordinarily, this will be based on the store associate hitting a TOTAL button on the cash register. Thereafter, the central registration computer system 14 is contacted and the general registration database 16 is updated with the transaction information.

Inasmuch as ER systems are known, further specific details regarding ER systems themselves will not be provided herein except as needed for a complete understanding of the invention. As seen from the above description of an ER system, original policies are defined for products when they are first sent to the retailer by the vendor. The ER system preferably includes the policies of both the vendor and the retailer and enables the policies of both parties to be easily and conveniently enforced.

Figure 2:
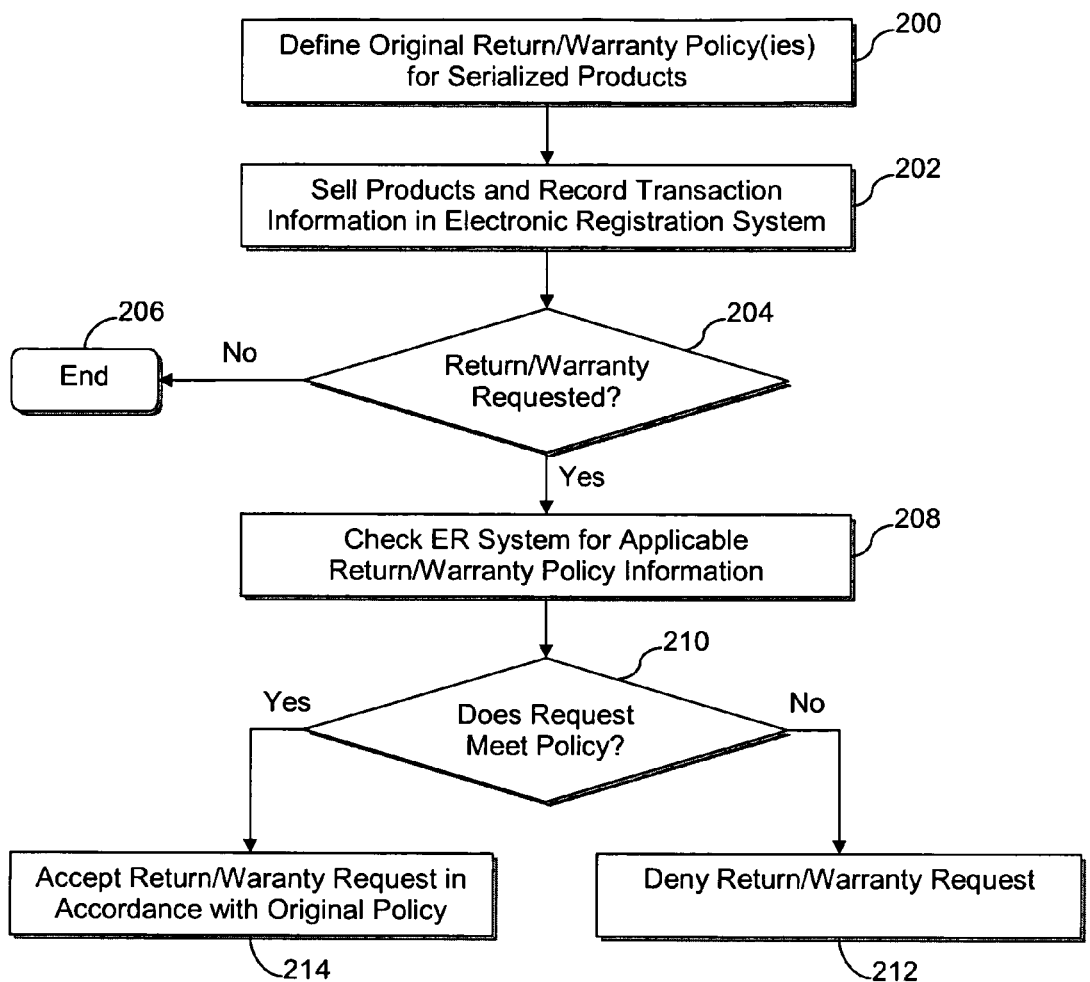
FIG. 2 is a high level flow chart of some of the main steps performed in accordance with prior electronic product registration (ER) systems.

FIG. 2 shows the main steps performed in connection with conventional ER systems. As shown in FIG. 2, the return/warranty policy(ies) are defined for serialized products and entered into the ER system (step 200). The ER system uses the policies and the sales transaction information, as well as the date on which a return is requested, to determine if the product qualifies for return when presented for return. Thus, when the products are sold, the sales transaction is recorded in the ER database (step 202). If the consumer is satisfied with the product, then the process ends (step 206). On the other hand, if a return is requested (step 204), the ER system is accessed to obtain the return qualification information for the specific product being presented for return (step 208). In accordance with conventional ER systems, the return request is handled based on the return qualification information provided by the ER system based on the original policies under which the product was originally sold. Thus, based on the return qualification information provided by the ER system, a determination is made as to whether or not the product qualifies for return/warranty repair or the like (step 210). If the product does qualify for the action requested, the request can be honored by the retailer and the transaction can be completed (step 214). On the other hand, if the ER system indicates that the product does not qualify for the requested action, the customer is typically denied the return or warranty repair (step 212). Of course, the store employee could decide, for some reason, to ignore the ER information and accept the product anyway.

A two-part policy generally is used with respect to transactions involving post-paid services/subscriptions and related products. The first part of a typical policy applies to activities that take place within a predefined time period (e.g., 30 days, 90 days, etc.). As one example, within 30 days, a customer may return a phone and cancel a corresponding wireless service at the retailer POS location. In this regard, the customer presents the phone for return at retailer's return counter. The customer sometimes may be redirected to a different location (e.g., a wireless electronics desk) for return service, depending on the specific retailer's capabilities and arrangements. Using the POS location's system, authorized personnel (e.g., a wireless store associate) accesses the original purchase record to determine whether the attempted return is within 30 days of the original purchase. If so, the customer is allowed to return the device, and the service is cancelled (e.g., by the wireless store associated on behalf, and with the permission, of the customer).

The second part of the typical policy applies to activities that take place outside of the predefined time period (e.g., beyond the 30-day, 90-day, or other time window). As one example, outside of 30 days and/or at any time under the services agreement between the consumer and the service provider, the customer may contact the service provider directly and cancel the service (e.g., by contacting the service provider over the phone, using a website, etc.). In such circumstances, the retailer often does not receive back the device hardware. These problems are further exacerbated when the retailer cannot collect the activation commission from the service provider. This represents a losing proposition for the retailer, regardless of whether it is caused by innocent error or with the intent to defraud the retailer and/or the service provider.

Thus, it will be appreciated that, as indicated above, current ER techniques could be improved by better "closing the gap" between (1) retailers that sell post-paid services/subscriptions on behalf of service providers, along with goods associated with such post-paid services/subscriptions, (2) and the service providers themselves. The current lack of communication between retailers and service providers potentially hurts retailers when consumers, intentionally or unintentionally, fail to return the previously obtained products during the time period in which the retailer is not entitled to a commission. Accordingly, certain exemplary embodiments relate to ER techniques that address one or more of these and/or other problems by providing, for example, unique item-level tracking from the POS transaction through to any cancellations in service and returns to the store or service provider.

Certain exemplary embodiments may involve an optional pre-registration process. The pre-registration process may involve shipping products to destinations and recording associated serial numbers (SNs) in an ER database of the ER system. In certain exemplary implementations, the service provider (e.g., the wireless service provider) is responsible for transmitting the device serial numbers to the ER system when the products are being shipped to retailer POS locations (e.g., from the wireless service provider directly, from the manufacturer of the devices, etc.). The ER system may receive information including serial numbers and/or other product identifiers such as, for example, UPC, IMEI (International Mobile Equipment Identity) number, along with other related information including, for example, shipping dates, target locations, etc. The ER system may record all of this information in a centrally accessible national ER database. It will be appreciated that, as described above, this information may be useful for inventory tracking purposes. It also will be appreciated that such information may be used to the transfer ownership to the retailer in the event of theft, thereby making it easier for the retailer to seek legal recourse against a thief and recovery of their property.

Following this or any other appropriate (though optional) pre-registration process, the wireless device, together with a post-paid service/subscription, may be sold at the retailer through the POS system. This sale may then trigger a POS electronic registration process. In brief, the retailer may capture and transmit (e.g., via scanning) the device serial number to the ER system when the product is sold to a consumer. The ER system will then receive this information and record it in the ER database. In this regard, the UPC and/or IMEI and serial number, or any other appropriate identifiers, may be recorded in the ER database, along with transaction information such as, for example, original sale date, POS location, sales person, POS service/subscription terms, etc. The ER system also may append the promotional hardware price to the transaction. See, for example, U.S. Pat. Nos. 5,978,774; 6,018,719; and 6,085,172, each of which is hereby incorporated herein by reference in its entirety. Once the sale is complete, the product may be activated, e.g., by communicating the UPC, IMEI, serial number, and/or other identifier(s) to the service provider from either or both of the POS location and the ER system. The service provider ideally will pay a commission to the retailer after a contracted duration of time elapses under the service contract. This commission may help to offset any or all of a discount offered to the customer by the retailer in connection with the product tied to the post-paid service/subscription.

Certain exemplary embodiments address four possible service cancellation scenarios. Each of these cancellation scenarios, and illustrative ways in which they are handled, are described in greater detail below and with reference to FIGS. 3-6.

EXAMPLE SCENARIO 1

Simple Return to Retailer

Figure 3:
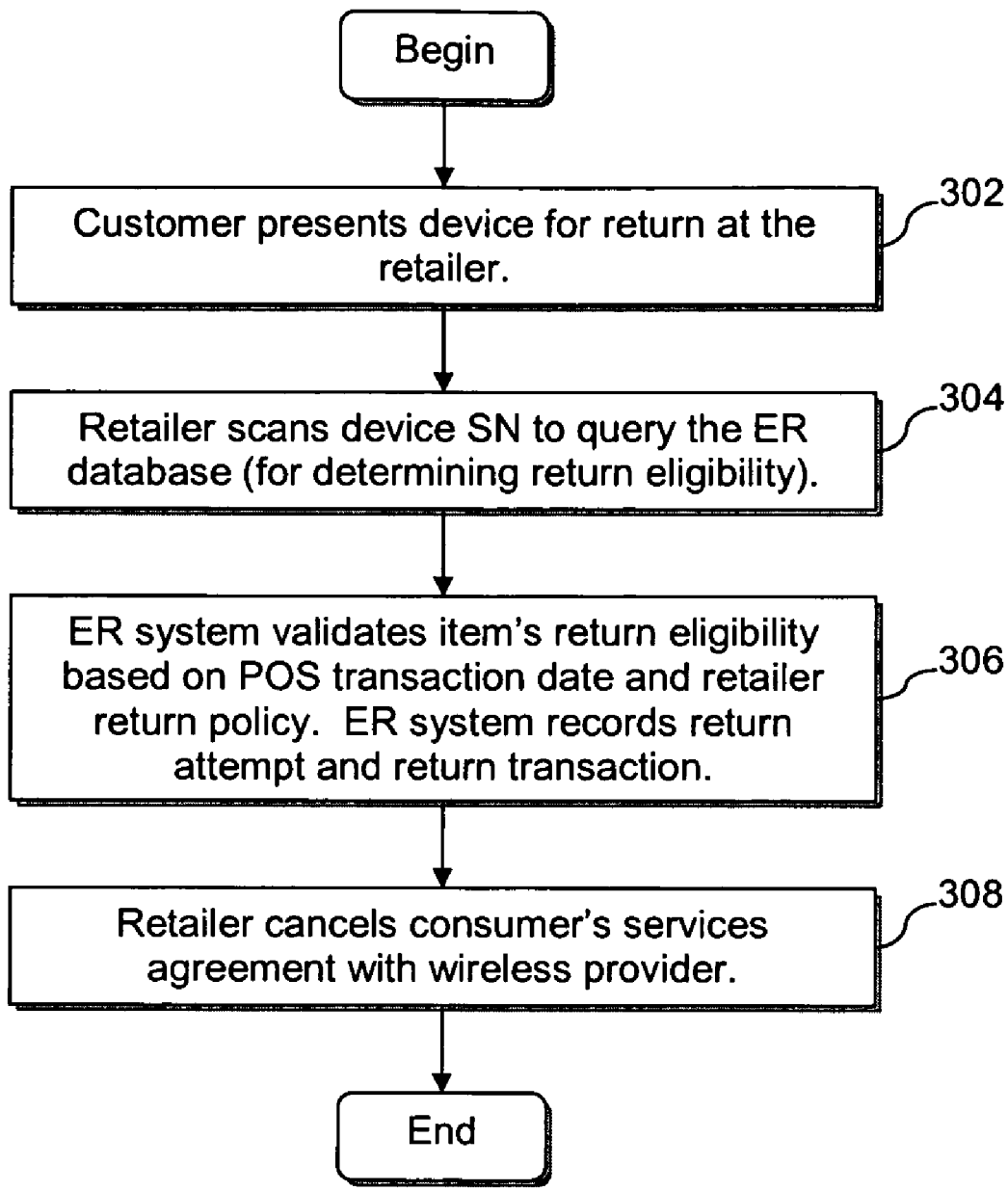
FIG. 3 is a flowchart illustrating a process for a simple return to the retailer within a predefined time period from the original sale date, in accordance with certain exemplary embodiments.
Figure 4:
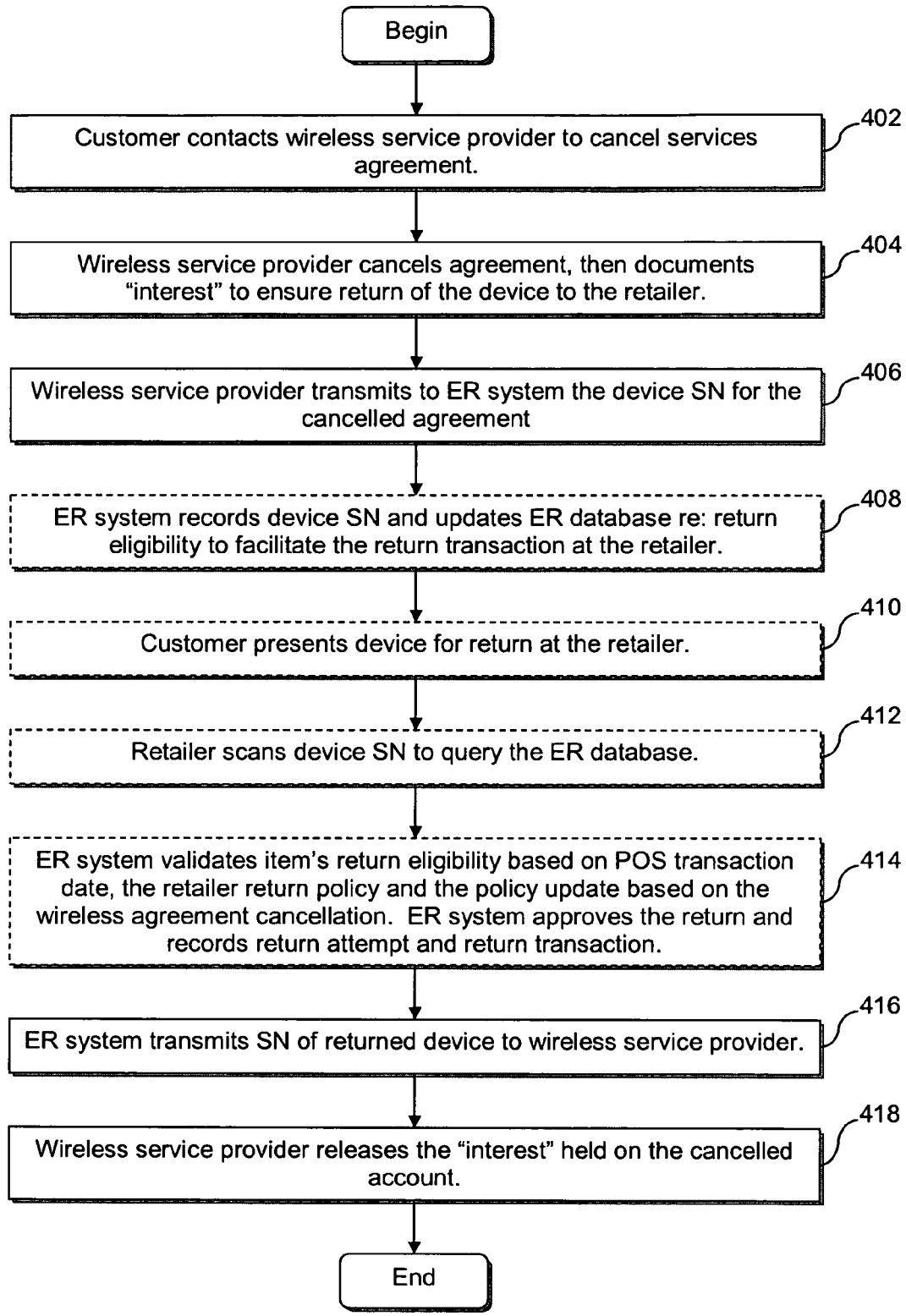
FIG. 4 is a flowchart illustrating a process when a customer cancels a service directly with the service provider and later returns an associated device to a retailer, in accordance with certain exemplary embodiments.

The first example scenario involves a simple return to the retailer within a predefined time period (e.g., 30 days) from the original sale date. Within the predefined time period, the customer may return the device to the retailer and cancel the service agreement. In this regard, FIG. 3 is a flowchart illustrating a process for a simple return to the retailer within a predefined time period from the original sale date, in accordance with certain exemplary embodiments.

In step 302, the customer presents the device for return at the retailer. The retailer then scans the device serial number to query the ER database (e.g., for later determining return eligibility) in step 304. In step 306, substantially real-time validation is performed against the national ER database, e.g., to determine return eligibility based on the item's original purchase record. From the customer's perspective, the return transaction is completed. In step 308, which is optional in certain exemplary embodiments, the retailer may cancel the consumer's services agreement with the service provider. This may be accomplished by transmitting the returned serial number (or IMEI or other unique identifier) to the service provider to "close the loop." Because the device is returned within the predefined time period (e.g., 30 days) from the original sale date, the retailer does not receive the commission, but the retailer does recover their hardware device. Of course, it will be appreciated that the decision as to whether to provide or deny the commission may be transparent to the customer.

EXAMPLE SCENARIO 2

Cancellation with Service Provider and Device Return

Figure 5:
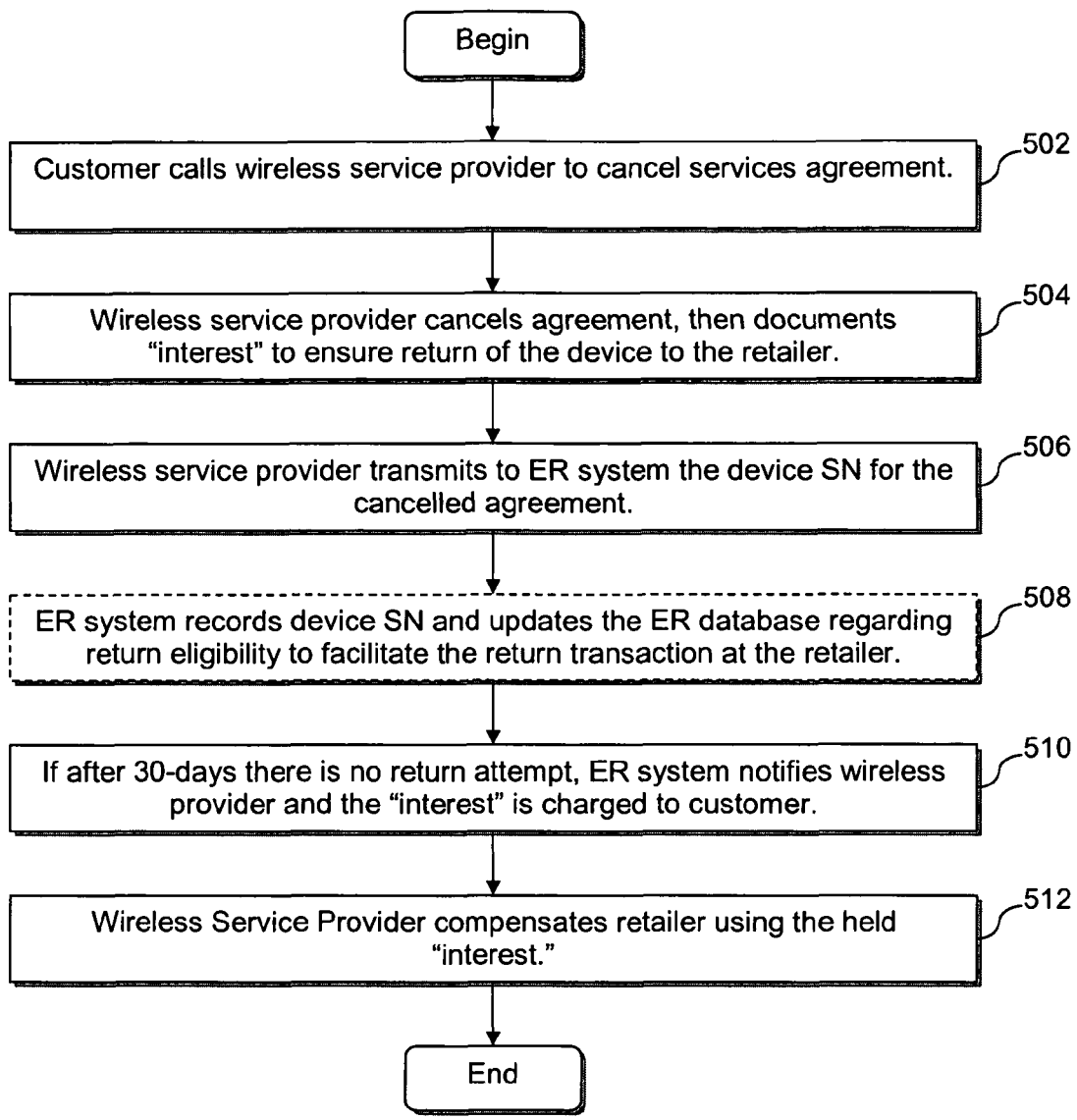
FIG. 5 is a flowchart illustrating a process when a customer cancels a service directly with the service provider and does not return an associated device to a retailer, in accordance with an exemplary embodiment.

At any time, the customer may choose to cancel the service agreement with the service provider, intentionally or unintentionally bypassing the retailer. In this regard, the second example scenario involves a cancellation directly with the service provider and a device return before the retailer is entitled to a commission from the service provider. FIG. 5 is a flowchart illustrating a process indicating what may happen in this scenario, in accordance with certain exemplary embodiments.

In step 402, a customer contacts the wireless service provider to cancel the services agreement with the service provider, absent direct involvement from the retailer. This sort of contact may be made by, for example, telephoning the service provider, accessing a website of the service provider, going to service provider's own POS location, etc. In step 404, the wireless service provider cancels the service agreement, and documents an "interest" to ensure return of the device to the retailer, and the service provider transmits to the ER system the device serial number for the product associated with the cancelled agreement in step 406. One or both of these steps may involve obtaining and transmitting the product's serial number (or IMEI or other identifying code), e.g., by scanning, reading an RFID tag, manual entering (e.g., on the part of wireless service personnel and/or the customer, etc.), and/or the like.

The "interest" may correspond to some or all of the retailer's normal commission and/or the price of the product. For example, in certain exemplary embodiments, the service provider may at least temporarily collect credit card information, or some other appropriate form of compensation, from the consumer. If the retailer's commission would have been $100, then this amount may be at least temporarily charged to the customer's credit card. In certain exemplary embodiments, a checking account may be debited, or scheduled for automatic debit (e.g., for processing in batch, for processing individually at a later time in the event that the product is not returned within a predetermined time interval, etc.). This amount may be fully or partially refunded to the customer, provided that the customer returns the product. A full refund may be available if the product is returned in normal working order, whereas only a partial or no refund may be available if the product is damaged or destroyed, etc. Alternatively, the amount may only be charged or debited in the event that the product is not returned to the retailer within a predetermined amount of time (e.g., a one-week, two-week, 30-day, or other window). It will be appreciated that the possible initial charging/debiting at the time of the cancellation, the possible later refunding, the possible later charging/debiting upon the lack of a satisfactory return, etc., may be facilitated at least in part by the ER system, which may track and/or schedule such events, and/or the service provider's systems. It is expected that sb doing will incentivize the customer to return the product to the retailer while also protecting the retailer's interest in the deactivated and/or no longer necessary product.

Steps 408 to 412 are optional addition and/or alternate steps that may be help facilitate the return of recalled items. Some current ER techniques allow validation only upon returns or product recalls, as opposed to service/subscription cancellation. Thus, although certain exemplary embodiments may modify existing ER systems to accommodate returns for corresponding service/subscription cancellation, certain exemplary embodiments may alternatively or in addition treat a service/subscription cancellation like a recall so that a default return policy override may enable the return of the hardware when the corresponding service/subscription cancellation is logged in the ER database. The manufacturer may transmit a list of recall serial number or other unique or non-unique identifiers to the ER system. The ER system may update the ER database extending and/or overriding each item's return eligibility, allowing returns of these items past the standard retailer return policy dates. The ER system may report the recall serial number returns to the retailer and manufacturer, in accordance with the accounting and other agreements that are relevant and in place as between the retailer, manufacturer, and/or service provider.

In particular, in step 408, the ER system records the device serial number and updates the ER database regarding return eligibility, to facilitate the return transaction at the retailer. In step 410, the customer presents the device for return at the retailer. In step 412, the retailer obtains (e.g., scans, reads an RFID tag, etc.) the device's serial number to query the ER database. The ER system then validates the item's return eligibility based on, for example, the POS transaction date, the retailer return policy and the policy update based on the wireless agreement cancellation. The ER system may approve the return when appropriate, and record the return attempt and return transaction, in step 414.

Regardless of whether the optional steps 408 to 414 are implemented, the ER system transmits the serial number of returned device to wireless service provider in step 416 and, in step 418, the wireless service provider releases the "interest" held on the cancelled account in the event that the product is returned within the allotted time period. It will be appreciated that "penalties" may be applied if the product is not returned at all or within the allotted time period. Such penalties may be monetary in nature, and may increase over time, e.g., until the full value of the product or the retailer's commission is met.

EXAMPLE SCENARIO 3

Cancellation with Service Provider and No Device Return

As indicated above, the customer at any time may choose to cancel the service agreement with the service provider, intentionally or unintentionally bypassing the retailer. In this regard, the third example scenario involves a customer cancelling directly with the service provider before the retailer earns a commission, and in which the customer does not return the associated product within a predefined time period following the cancellation, and FIG. 5 is a flowchart illustrating a process indicating what may happen in this scenario, in accordance with certain exemplary embodiments.

As shown in FIG. 5, a customer contacts the service provider to cancel the services agreement in step 502. It will be appreciated that the customer may contact the service provider in the above-described and/or any other appropriate way. In step 504, the service provider cancels the agreement, and documents the "interest" to help ensure return of the device to the retailer. The service provider transmits to the ER system the device serial number for the cancelled agreement in step 506.

In an optional step 508, which may be enabled for product recalls, for instance, the ER system records the device serial number and updates the ER database regarding return eligibility to facilitate the return transaction at the retailer. In any event, in step 510, if after a predetermined amount of time (e.g., one week, two weeks, 30-days, etc.) there is no return attempt, the ER system may notify the wireless provider, and the "interest" may be charged to customer. In step 512, the service provider compensates the retailer using the held "interest."

As noted above, the "interest" may be charged immediately or only after the predetermined amount of time has passed. Even after that time, the user may be entitled to a partial or complete refund of the "interest" depending, for example, on the state of the returned device. In such example instances, the refund may be made from the retailer as opposed to the service provider.

In certain exemplary embodiments, the "interest" or information about the interest may be taken by the service provider, with the service provider then holding this interest and the ER system directing its possible release, transfer, etc. However, in certain exemplary embodiments, the ER system itself may hold some or all of the collected money in escrow and later disburse it to the retailer, service provider, and/or customer, as appropriate. This latter arrangement may be advantageous, for example, in that it may allow for the direct transfer of funds without relying on intervening instructions and/or approvals from the service provider, retailer, customer, etc. It will be appreciated that this escrow-like function may be used in this or any other scenario involving the taking of an interest. Likewise, it will be appreciated that the taking of the interest and the charging of the interest may be accomplished at the same time (e.g., at the time of the service cancellation) or at different times (e.g., "taking" at the time of the service cancellation and "charging" beyond a predetermined amount of time), in different exemplary embodiments and in this or any other scenario.

EXAMPLE SCENARIO 4

Cancellation with Device Return

Figure 6:
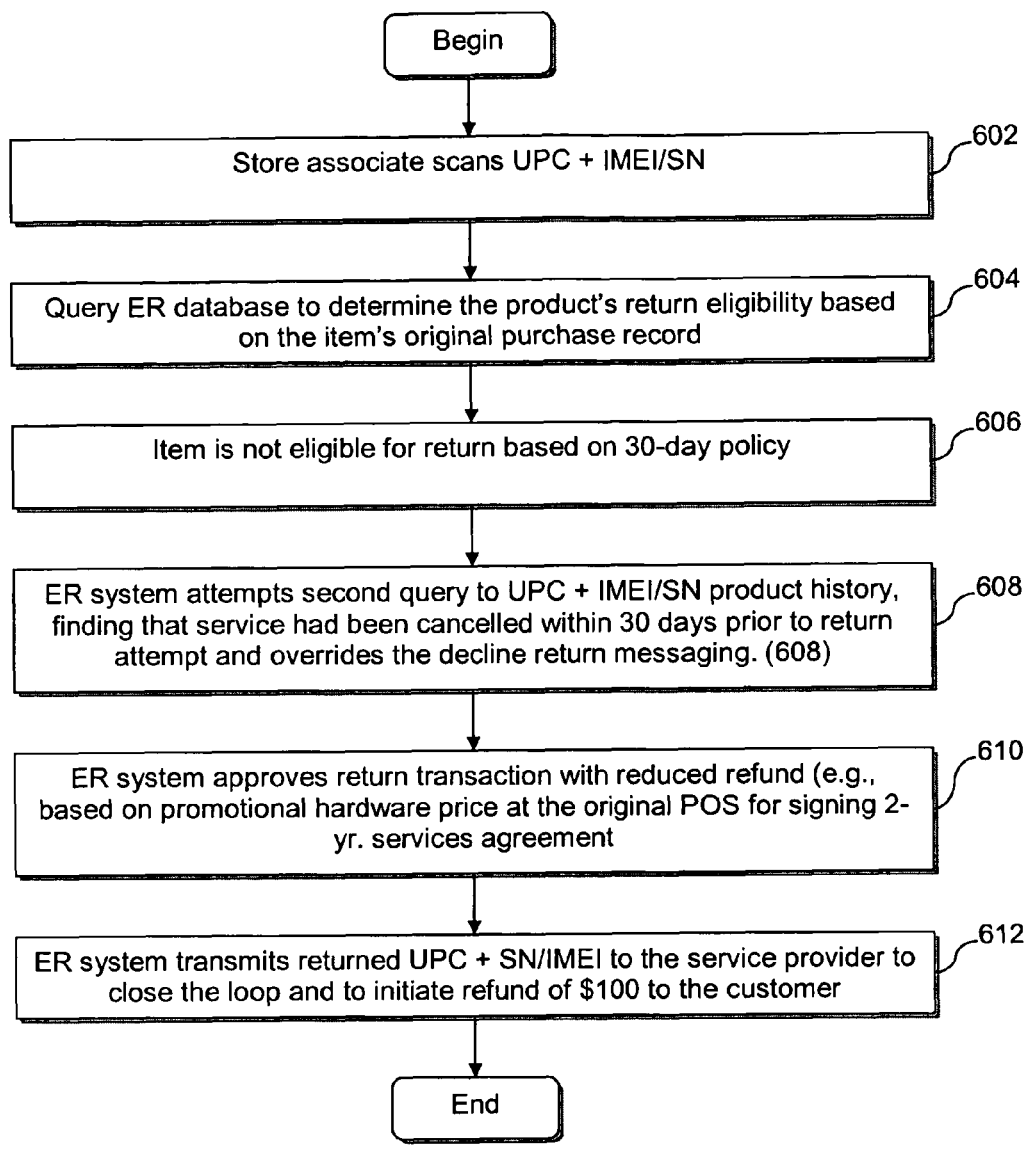
FIG. 6 is a flowchart illustrating a process for a return to the retailer beyond a predefined time period from the original sale date, in accordance with certain exemplary embodiments.

The fourth example scenario involves a return to the retailer outside of a predefined time period (e.g., 30 days) from the original sale date. The default action would be to deny the return because it is outside of the predefined time period. However, because the product is tied to the service/subscription agreement, the default action may be overridden based on the retailer's policy (e.g., accepting returns when the service/subscription is cancelled). The override of the return denial may be treated like a product recall (see above), e.g., so that the retailer can process the return in accordance with the applicable policy for products tied to post-paid services/subscriptions. In this regard, FIG. 6 is a flowchart illustrating a process for a return to the retailer beyond a predefined time period from the original sale date, in accordance with certain exemplary embodiments.

In step 602, the store associate identifies the product, e.g., by scanning the UPC, serial number, and/or IMEI number. In step 604, substantially real-time validation is performed against the ER database to determine the product's return eligibility based on the item's original purchase record. It is determined in step 606 that the item is not eligible for return based because the predefined time period (e.g., 30-day) beyond the original purchase date has passed. However, in step 608, the ER system attempts a second query against the product history (e.g., with reference to the unique identifier) and finds that the service had been cancelled within a second predefined amount of time (e.g., 30 days) prior to the present return attempt and, accordingly, overrides the decline return messaging in accordance with the applicable return policy.

Given this second query, in step 610, the ER system approves the return transaction with a reduced refund (e.g., $100 or any other appropriate amount based on, for instance, the promotional hardware price at the original POS for signing services agreement. The ER system transmits the returned SN/IMEI to the service provider to close the loop and to initiate refund of $100 to the customer in step 612.

Although several example scenarios have been provided above, it will be appreciated that they are not exhaustive. Other return/cancellation scenarios also are possible and may be handled in accordance with the example techniques described herein. For example, in certain exemplary embodiments, the $100 need not be collected/refunded if the product is in proper working order at the time of the cancellation.

It will be appreciated that the exemplary techniques described herein may lead to a number of advantages. For example, the exemplary embodiments described herein may lead to cost savings for retailers, e.g., as they may at least partially make up for lost commissions by either receiving a returned product from a cancelling customer or receiving monetary compensation from that cancelling customer. Similarly, it will be appreciated that certain exemplary embodiments advantageously may result in improved relationships between retailers and wireless service providers, e.g., in that retailers will not feel "cheated" out of commissions or unduly burdened with the costs of intentionally or unintentionally non-returned products. Further, certain exemplary embodiments advantageously may reduce the likelihood of consumer fraud related to devices sold along with post-paid and/or subscription services.

The ER database of certain exemplary embodiments may store only product-related information. That is, in certain exemplary embodiments, the ER database may not store information related to individuals purchasing, returning, exchanging, or otherwise dealing with products. For example, individual names, addresses, credit card information, etc., need not be maintained by the ER database itself in certain exemplary embodiments. Rather, this information may instead be maintained by the POS location's systems and/or other third-party systems. Having the ER database track products rather than people may be advantageous in certain instances, as consumer anonymity may be maintained.

Although certain exemplary embodiments have been described in relation to wireless devices and services sold at retail locations, it will be appreciated that the exemplary techniques described herein may be applied to other kinds of products, or even goods and services. In general, the exemplary techniques described herein may be applied to any goods that are coupled to services that are sold at non-service provider locations. For example, the techniques of certain exemplary embodiments may be applied to cable boxes and cable services, satellite dishes and satellite services, satellite radios and satellite radio services, etc. Furthermore, the service/subscription need not be "post-paid" in certain exemplary embodiments.

Additionally, although certain exemplary embodiments have been described as relating to serial numbers and/or IMEI numbers, it will be appreciated that the techniques described herein may be applied to products identified in different ways, e.g., by EPC, RFID, EAN, JAN, etc.

Additionally, although certain exemplary embodiments have been described in relation to products having serial numbers, the present invention is not so limited. For example, unserialized products may also take advantage of the techniques described herein by virtue of other unique and/or identifiable characteristics thereof. Furthermore, certain products are produced in such limited quantities that their mere existence may be self-authenticating and/or self-identifiable. Additionally, certain products are so tightly controlled that their appearance via other channels may indicate a potential problem worthy of notification to a trusted authority (e.g. the auction house, a manufacturer, a trusted ER intermediary, etc.).

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the scope of the appended claims.

What is claimed is:

1. A method of facilitating return of products sold in connection with services at point-of-sale (POS) locations, the method comprising:
    registering a sale of a service and a product associated with the service to a customer with an electronic registration (ER) system, the registering including storing an original sale date and an identifier associated with the product in an ER database of the ER system;
    when the service is cancelled by the customer at the POS location:
        processing a return transaction through the ER system in accordance with a return policy of the POS location and/or the service provider, and
        updating the ER database to reflect the return of the product and the cancellation of the service; and
    when the service is cancelled by the customer through the service provider:
        taking a monetary interest from the customer, on behalf of the POS location, in the event that the customer does not subsequently return the product to the POS location in order to help protect the POS location from having to absorb a loss associated with the customer's of the interest,
    wherein the interest corresponds to an amount of commission owed to the POS location from the service provider.

2. The method of claim 1, wherein the updating of the ER database further comprises establishing a time period during which the customer is to return the product to the POS location when the service is cancelled by the customer through the service provider.

3. The method of claim 2, further comprising when the customer returns the product to the POS location within the time period, returning the interest.

4. The method Of claim 3, further comprising:
    updating the ER database to indicate that the product is a recalled product;
    when the customer returns the product to the POS location within the time period, processing a return transaction in accordance with a return policy of the POS location and/or the service provider by treating the product as if the product were recalled.

5. The method of claim 4, further comprising overriding any return denial at the POS location based on the fact that the ER database indicates that the product is a recalled product.

6. The method of claim 2, further comprising when the customer does not return the product to the POS location within the time period, transferring at least a portion of the interest to the POS location.

7. The method of claim 6, wherein the taking of the interest further comprising:
    obtaining credit card information from the customer, and providing the interest to the POS location using the credit card information.

8. The method of claim 2, wherein the taking of the interest includes charging a credit card of the customer.

9. The method of claim 8, further comprising when the customer returns the product to the POS location within the time period, returning the interest by refunding any amount charged to the credit card of the customer.

10. The method of claim 1, wherein the product is a mobile telephone and the service is a post-paid wireless service.

11. A electronic registration (ER) system, comprising:
    an ER database configured to store information pertaining to sales of services and products associated with the services, the information including original sale dates and identifiers associated with the products, the sales having taken place at point-of-sale (POS) locations;
    a computer configured to execute instructions tangibly stored on a computer-readable storage medium, the instructions causing the computer to at least perform:
    when a service is cancelled by a customer at a POS location:
        processing a return transaction through the ER system in accordance with a return policy of the POS location and/or the service provider, and
        updating the ER database to reflect the return of the product and the cancellation of the service; and
    when the service is cancelled by the customer through the service provider:
        taking a monetary interest from the customer, on behalf of the POS location, in the event that the customer does not subsequently return the product to the POS location in order to help protect the POS location from having to absorb a loss associated with the customer's of the interest,
    wherein the interest corresponds to an amount of commission owed to the POS location from the service provider.

12. The system of claim 11, wherein the updating of the ER database further comprises establishing a time period during which the customer is to return the product to the POS location when the service is cancelled by the customer through the service provider.

13. The system of claim 12, wherein the computer is further configured to return the interest when the customer returns the product to the POS location within the time period.

14. The system of claim 13, wherein the computer is further configured to:
    update the ER database to indicate that the product is a recalled product;
    process a return transaction in accordance with a return policy of the POS location and/or the service provider by treating the product as if the product were recalled when the customer returns the product to the POS location within the time period.

15. The system of claim 14, wherein the computer is further configured to send an override signal to the POS location to override any return denial based on the fact that the ER database indicates that the product is a recalled product.

16. The system of claim 12, wherein the computer is further configured to transfer at least a portion of the interest to the POS location when the customer does not return the product to the POS location within the time period.

17. The system of claim 16, wherein the taking of the interest includes obtaining credit card information from the customer, and providing the interest to the POS location using the credit card information.

18. The system of claim 12, wherein the taking of the interest includes charging a credit card of the customer.

19. The system of claim 18, wherein the computer is further configured to return the interest by refunding any amount charged to the credit card of the customer when the customer returns the product to the POS location within the time period.

* * * * *